United States Patent [19]
Kim

[11] Patent Number: 6,044,473
[45] Date of Patent: Mar. 28, 2000

[54] PORTABLE COMPUTER HAVING A SWITCH FOR CHANGING A POWER-CONTROLLING MODE

[75] Inventor: Tae-Yong Kim, Suwon, Rep. of Korea

[73] Assignee: SamSung Electronics Co., Ltd., Kyungki-do, Rep. of Korea

[21] Appl. No.: 09/009,654

[22] Filed: Jan. 20, 1998

[30] Foreign Application Priority Data

Mar. 25, 1997 [KR] Rep. of Korea ...................... 97-10359

[51] Int. Cl.[7] .................................................... G06F 1/00
[52] U.S. Cl. ...................... 713/320; 713/323; 713/324; 361/681; 361/683
[58] Field of Search .................................. 713/300–340; 361/681, 683

[56] References Cited

U.S. PATENT DOCUMENTS

| 5,167,024 | 11/1992 | Smith et al. |
| 5,235,532 | 8/1993 | Sugino ..................................... 713/321 |
| 5,303,171 | 4/1994 | Belt et al. ............................... 713/321 |
| 5,345,362 | 9/1994 | Winkler ................................... 361/681 |
| 5,450,271 | 9/1995 | Fukushima et al. |
| 5,606,303 | 2/1997 | Suski |
| 5,612,520 | 3/1997 | Toedtman et al. |
| 5,613,135 | 3/1997 | Sakai et al. .............................. 710/62 |
| 5,796,576 | 8/1998 | Kim ........................................ 361/681 |

*Primary Examiner*—Ayaz R. Sheikh
*Assistant Examiner*—Rupal D. Dharia
*Attorney, Agent, or Firm*—Robert E. Bushnell, Esq.

[57] ABSTRACT

The present invention relates to a portable computer having a switch for changing a power-controlling mode. In a portable computer which a display and a main housing are connected by a hinge, the object of the present invention cuts off or controls power automatically, when a user does not turn off a system and then close a display of a portable computer. To achieve these objectives, the present invention comprises a fixed axle, a lever and a power-controlling mode switch. The fixed axle is formed in the inner part of the display. The lever, which is connected with the fixed axle, turns in accordance with an angle between the display and the main housing. The power-controlling mode switch changes a power-controlling mode of a portable computer in accordance with a turning of the lever.

18 Claims, 6 Drawing Sheets

PORTABLE COMPUTER HAVING A SWITCH FOR CHANGING A POWER-CONTROLLING MODE

CLAIM OF PRIORITY

This application makes reference to, incorporates the same herein, and claims all benefits accruing under 35 U.S.C. § 119 from an application for *Portable Computer Having a Switch For Changing A Power-Controlling Mode* earlier filed in the Korean Industrial Property Office on Mar. 25, 1997 and there duly assigned Ser. No. 10359/1997

FIELD OF THE INVENTION

The present invention relates to a portable computer having a switch for changing a power-controlling mode and more particularly to a portable computer having a switch for changing the power-controlling mode for cutting off or controlling power automatically, when a display of a computer is closed while the system is still in an ON state.

DESCRIPTION OF THE RELATED ART

Generally, a portable computer has exploited a variety of power-controlling devices for reducing power consumption and thereby extending working hours because a portable computer uses a power source, such as a battery, which can supply a limited amount of power. Conventional methods of controlling power can be achieved through software or hardware manipulation. For example, U.S. Pat. No. 5,612,520 for a *Suspend Switch For Portable Electronic Equipment* to Toedtman et al discloses a switch that places a notebook computer into a low power consumption mode or a sleep mode when the display containing cover of the notebook computer is rotated closed onto the keyboard containing base. However, the switch used in Toedtman et al is not concealed. In addition, the notebook computer must be completely closed in order to activate the switch. I have not seen a switch placing a notebook computer in a sleep or suspend mode that is either concealed or that can be activated when the display containing lid is at an angle with the keyboard containing base.

SUMMARY OF THE INVENTION

It is therefore an object of the present invention to provide an improved switch for conserving the energy in a portable computer.

It is also an object to provide a portable computer having a concealed switch for changing a power-controlling mode.

It is yet another object to provide a switch for a portable computer that allows the portable computer to go into a low power consumption mode when the display unit is at an angle with the keyboard containing base.

It is also an object to provide a power controlling device and apparatus in accordance with a user's intention or a system state of a portable computer and which has a simple structure and thereby can be repaired simply when that switch is not working.

To achieve these and other objects in a portable computer which a display and a main housing is connected by a hinge, the present invention comprises a fixed axle, a lever and a power-controlling mode switch. The fixed axle is formed in the inner part of the display. The lever, which is connected to the fixed axle, turns in accordance with an angle between the display and the main housing. The power-controlling mode switch changes a power-controlling mode of a portable computer in accordance with a turning of the lever. In an embodiment of the present invention, the lever turns by gravity or magnetic force in accordance with an angle between the display and the main housing, and the power-controlling mode can be manipulated to be changed at a predetermined time after an electrical contact occurs.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 4:
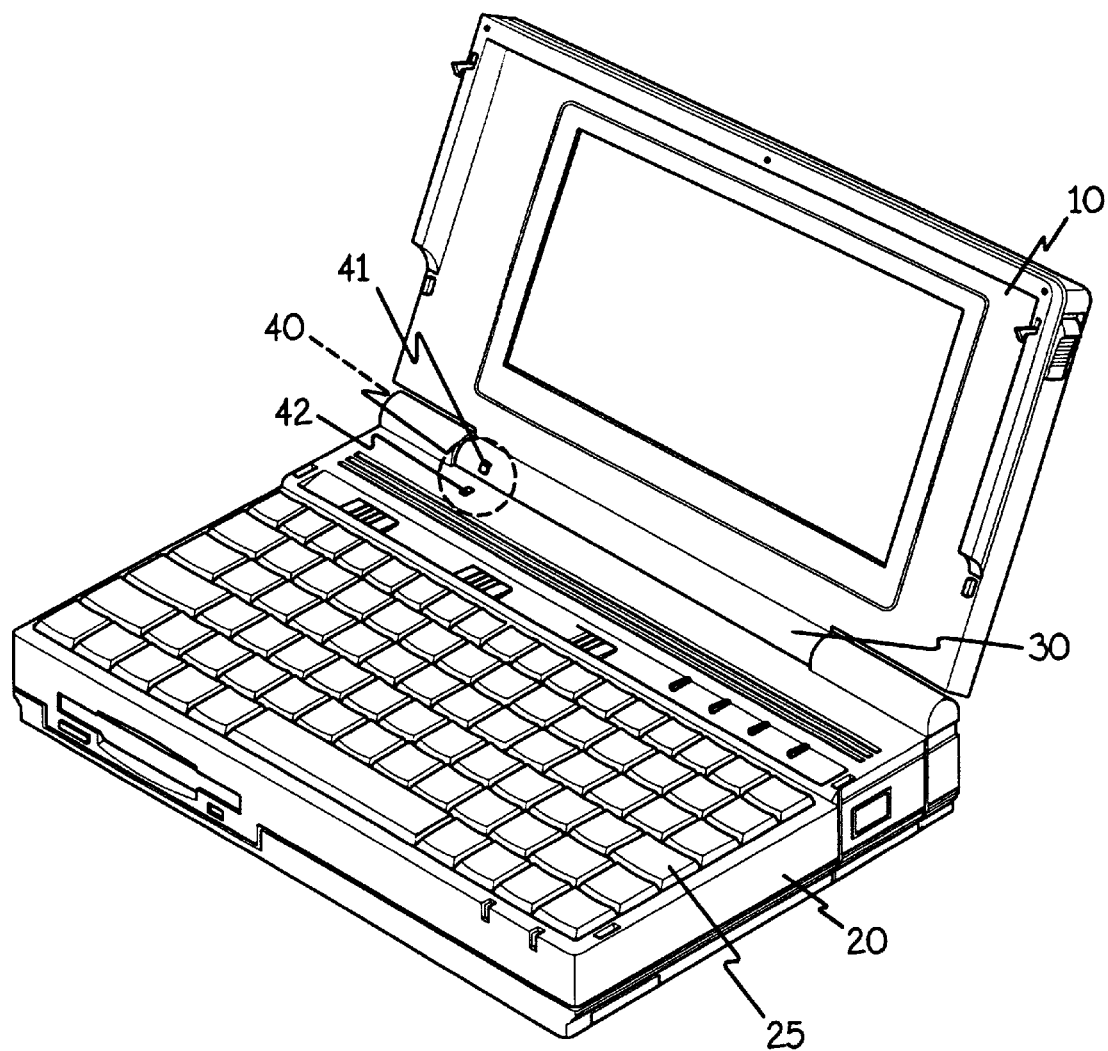
FIG. 4 is a perspective view of a portable computer having a switch for changing the conventional power-controlling mode.

FIG. 4 illustrates the use of a toggle switch to switch a portable computer into a low power consumption or sleep mode. The power of a system is changed to another state when the switch 41 on the display 10 contacts the switch 42 on the main housing 20. Since a power mode-changing switch is formed on the main housing 20, the above-identified method has several problems. For example, manufacturing cost increases and the keyboard 25 is not easy to use because of the increasing number of switches on the main housing 20 that need to be controlled. Also, in place of the above-identified switch, the power of a system can be changed to another state by software when a combination of keys, such as a function key and an Alt key or a Ctrl key and a Shift key, are pressed. In this case, remembering such a sequence is a cumbersome task.

Figure 1:
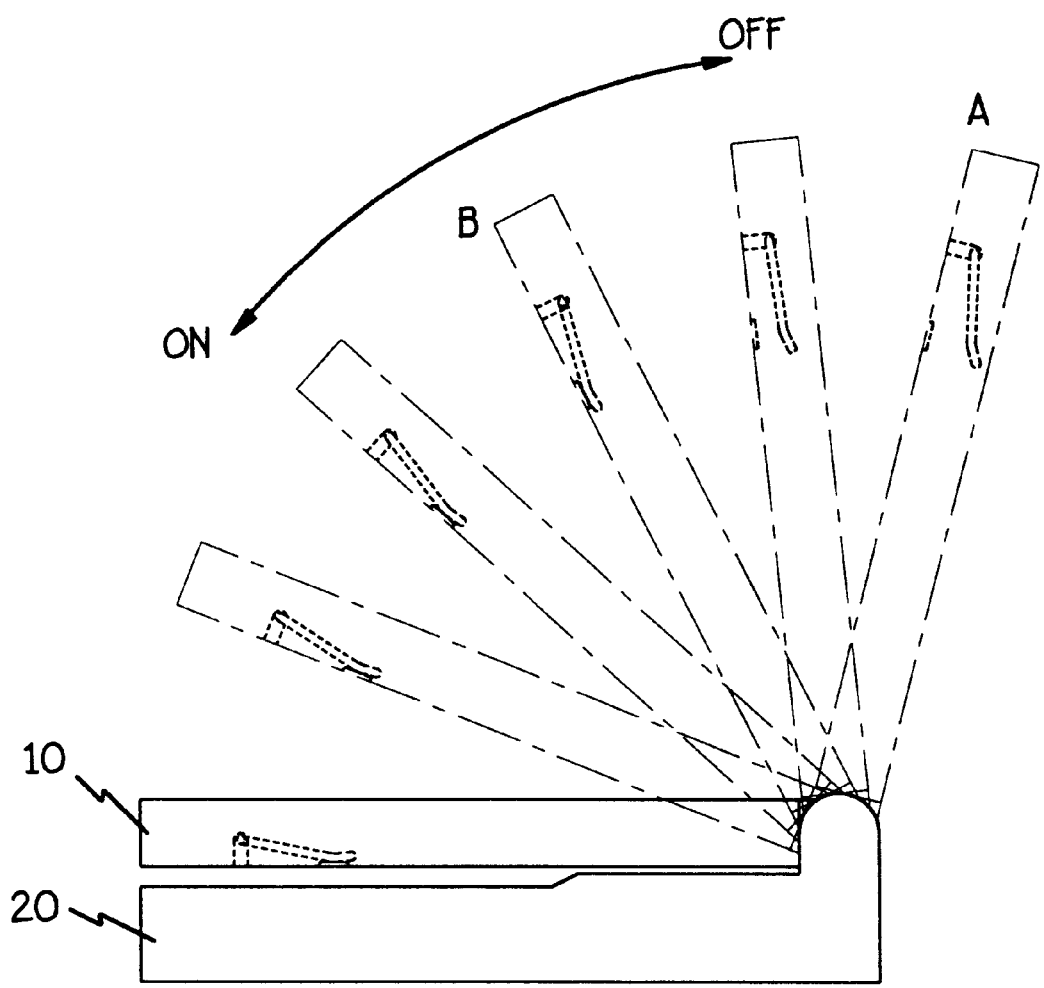
FIG. 1 illustrates an operation of a portable computer having a switch for changing a power-controlling mode according to the present invention.
Figure 2:
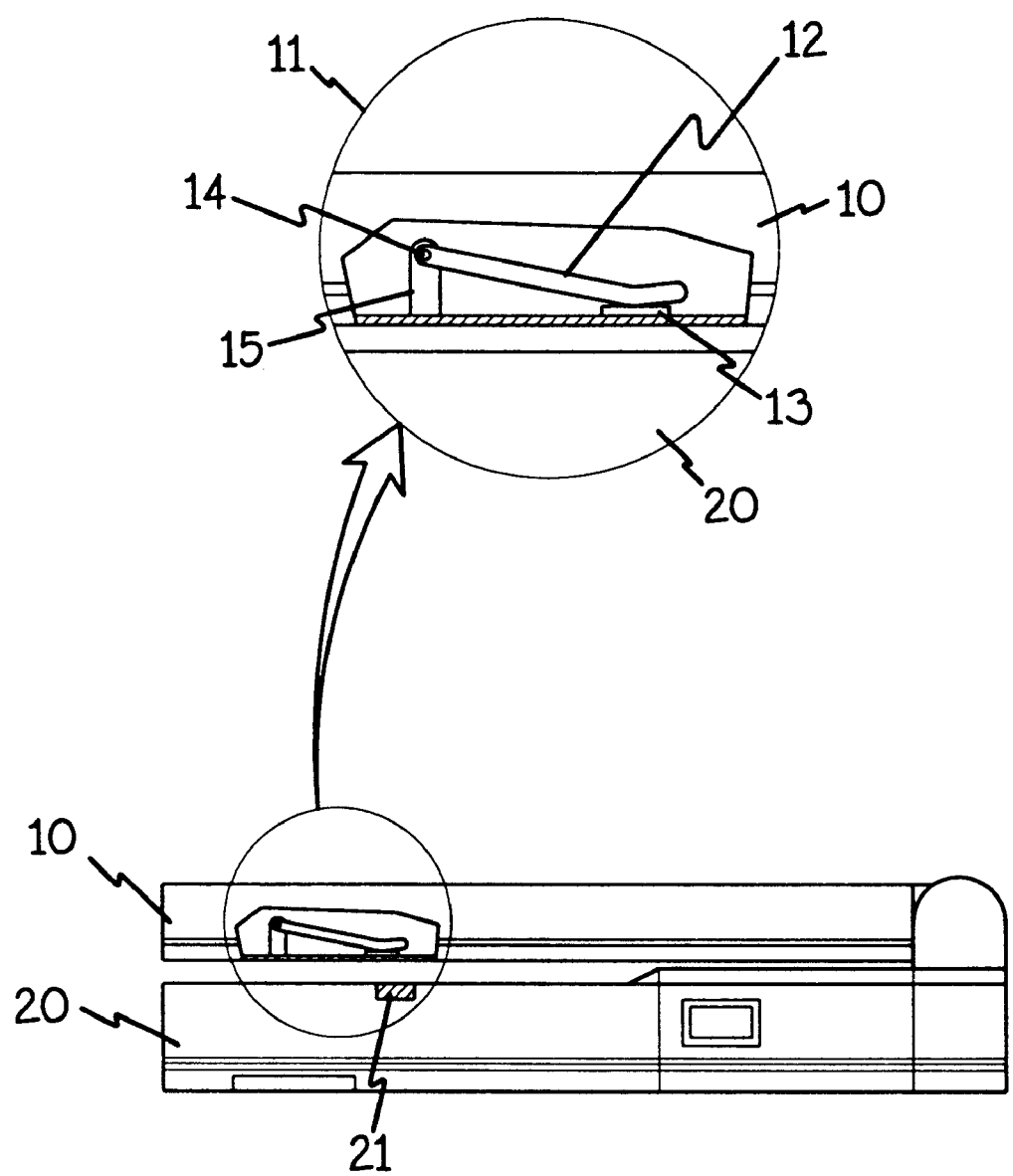
FIG. 2 is a partial cross-sectional elevational view of a portable computer having a switch for changing a power-controlling mode according to the present invention.

Yet another method to solve the above-identified problems is as follows. When a user closes a portable computer, a pair of switches, respectively formed on a display 10 and a main housing 20, contact each other and then a power-controlling function is performed. This conventional system should form a switch on a restricted region of the main housing of a computer and be made up of not less than two parts for making an ON/OFF switch. Accordingly, an assembly process gets complex and, if these switches 41 and 42 are not working, an entire system should be disassembled for repair. In addition, an appearance of a portable computer becomes complex Turning to FIG. 1, when the portable computer having a display 10 and a main housing 20 is closed, a user can not operate the computer. Accordingly, it is desirable to change the power of a computer system to a low power consumption mode. This is a point of the present invention. Generally, when a user uses a portable computer, the angle between the display 10 and the main housing 20 or the ground is from 70 to 120 degrees. However, as shown in FIG. 1, when a user stops using a computer, the display 10 is usually closed or partially closed at about a 30 degree angle to the main housing 20 in order to use the working space more efficiently. In the above-identified state, in order to change the power of a computer system to a power saver mode(or resume mode or sleep mode), a switch according to the present invention is formed in the inner part of the display 10. According to the embodiment of the present invention, as shown in FIG. 2, the switch 11 comprises a prop 15 and an axle 14, a lever 12 and a contact 13.

Figure 3A:
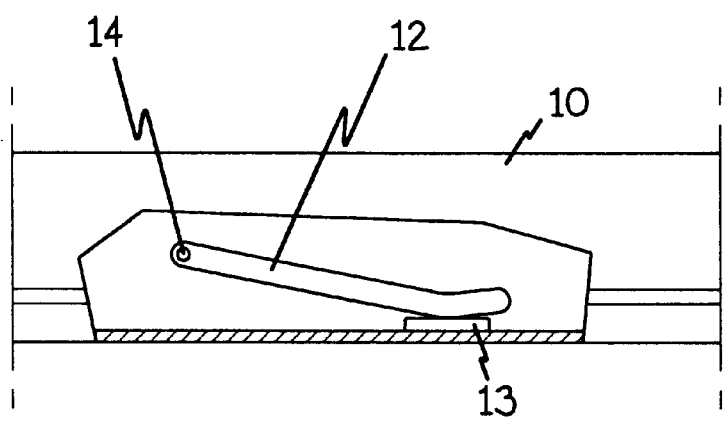
FIGS. 3a and 3b are cross-sectional elevational view and a front cross-sectional elevational view of a power-controlling mode switch of a portable computer according to a further embodiment of the present invention.
Figure 3B:
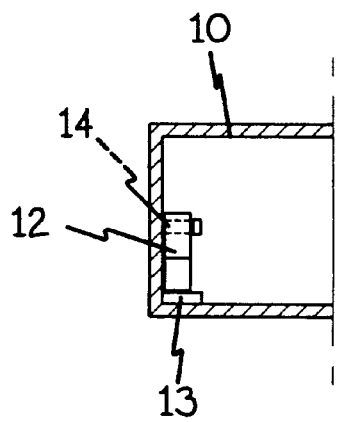

The axle 14 may be formed anywhere in the inner part of the display 10 as long as the lever 12 is allowed to turn. That is, as shown in FIG. 2, the axle 14 may be separately formed on the prop 15 or, as shown in FIG. 3, formed as a projection part on both sides of the display 10. At this point, one side of the lever 12 is connected to the end of the axle 14 and the lever 12 rotates about axle 14 according to an angle between the display 10 and the ground.

Figure 5:
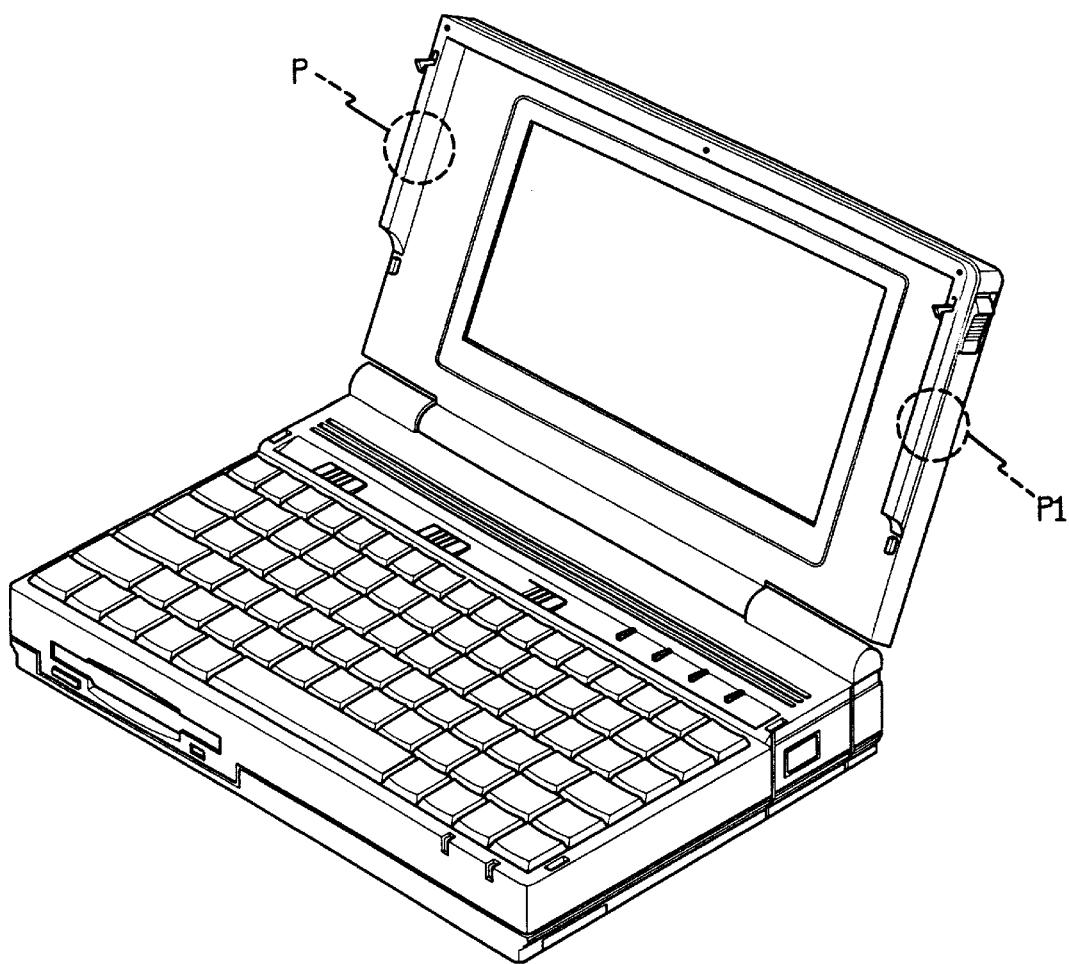
FIG. 5 illustrates the location of a power-controlling mode switch formed on a portable computer according to the embodiment of the present invention.

FIG. 1 illustrates the operation of the above-identified lever 12. That is, FIG. 1 illustrates the turning operation of the lever 12 by gravity in accordance with an angle between the display 10 and the main housing 20. While the display 10 turns from point A to point B, the lever 12 and the contact 13 connect when the display 10 and the main housing 20 are at an angle of less than 90 degrees. At this point, the switch 11 is turned on and a signal from the switch 11 changes the power of a computer system to a power controlling mode. The contact 13 is formed in the inner part of the display part 10 in order to contact the lever 12. According to the embodiment of the present invention, the lever 12 rotates according to an angle between the main housing 20 and the display 10. Also, the magnet 21 formed in the main housing 20 has an influence on the lever 12 and the contact 13 to electrically connect according to an angle between the display 10 and the main housing 20. That is, when the display 10 is closed, a magnetic force of the magnet 21, formed in the inner part of the main housing 20, influences the lever 12 to electrically connect the contact 13. FIG. 5 illustrates the position of the power-controlling mode switch 11 which can be formed in the portable computer. Preferably, the power-controlling mode switch 11 can be formed at P and P' which are on opposite sides of an LCD panel of the display part 10.

Figure 6:
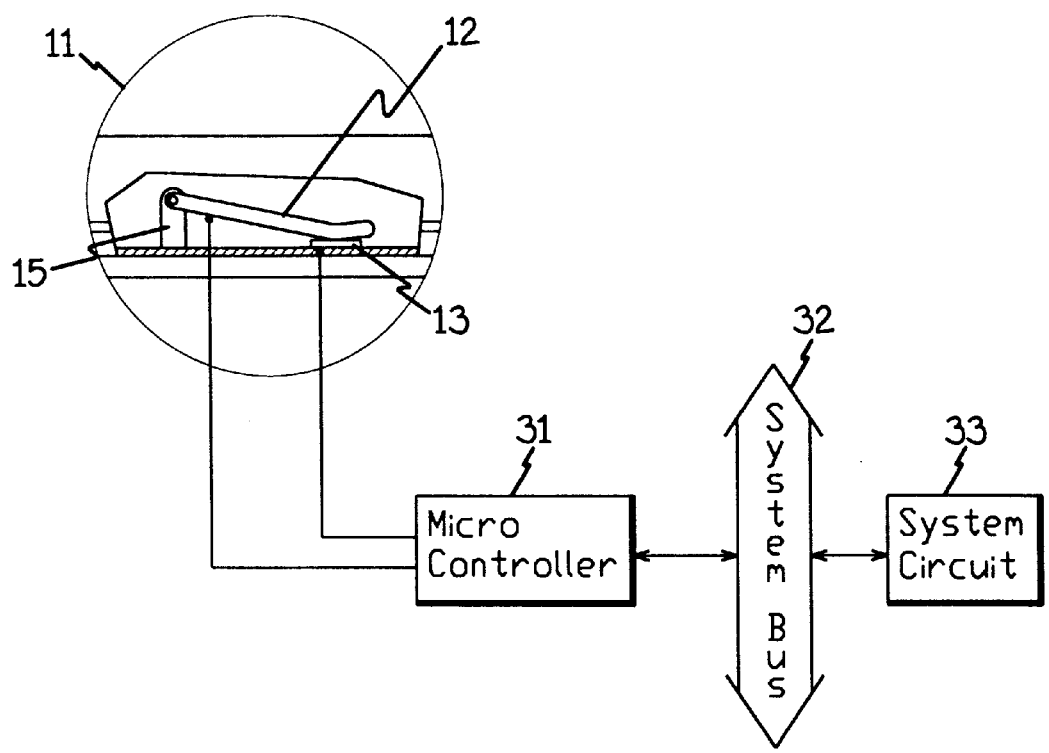
FIG. 6 is a function block diagram illustrating an operating principle of a power-controlling mode switch according to the present invention.

FIG. 6 is a function block diagram illustrating an operation principle of a power-controlling mode switch according to the present invention. When the lever 12 contacts the contact 13, a contact signal is generated. Such contact signal operates a microcontroller 31 and, through a system bus, controls a system circuit 33.

According to the embodiment of the present invention, when a user rotates the display 10 toward the main housing 20 and the view of LCD part of the display 10 is at an angle that is out of view from the user, the power-controlling mode switch 11 operates. Also, the display 10 can be very often opened and closed in error or for any other reason. For this reason, in order to prevent the inadvertent activation of the power saving mode, a user can manipulate a power-controlling management program to control the power 5 to 10 seconds after the switch 11 operates. Some hardware devices such as a buffer may be formed on the switch 11 in order to delay a signal from the switch 11 for a predetermined time. These devices play a role to prevent a computer system from repeating an ON/OFF operation or a conversion into a power-controlling mode.

As one of the conventional power-controlling methods, the software-using method controls application of power in accordance with whether a signal is input or not for a fixed time. By using this method jointly, the present invention can change the power of a computer system to a low power-consuming mode, when a user closes the display before a fixed time, and to a power-save mode after a fixed time, although an angle between the display 10 and the main housing 20 is not changed.

An object of the present invention is to provide a power-controlling mode switch which a switch for controlling power is not exposed, which a power mode can be controlled in accordance with a user's intention or a system state of a portable computer and which has a simple structure and thereby can be repaired simply when the switch is not functional. Also, using the switch according to the present invention gives a user much more added value by extending the battery-using period of the portable electronic device. Furthermore, as the switch is formed in the inner part of the display, it is possible that a user may efficiently exploit the inner part of the main housing which house vital components. In addition, the appearance of a computer is not negatively affected by any unnecessarily exposed switches.

Having described and illustrated the principles of the invention in the preferred embodiments thereof, it should be apparent that the invention can be modified in arrangement and detail without departing from such principles. We claim all modifications and variations coming within the spirit and scope of the following claims.

What is claimed is:

1. A portable computer, comprising:
   a main housing of said computer;
   a keyboard mounted upon said main housing;
   a display rotatably connected to and driven by said main housing to provide visual display of images;
   a switch installed within said display, said switch comprising:
      an axle formed in an inner part of said display; and
      a lever pivotally mounted on said axle to rotate about said axle in dependence upon rotation of said display relative to said main housing and operationally control consumption of power by said computer as said rotation varies as angle between the display and the main housing.

2. The switch portable computer of claim 1, further comprising:
   a first contact borne by said lever; and
   a second contact positioned within said display to electrically contact said first contact in dependence upon said rotation.

3. The portable computer according to claim 1, wherein the lever rotates about said axle in response to gravity according to variation in said angle between said display and the main housing of the portable computer.

4. The portable computer according to claim 1, further comprising a magnet, mounted on said portable computer to magnetically influence pivoting of said lever about said axle.

5. The portable computer according to claim 1, further comprising a delay regulating change in said consumption of power by initiating a power-controlling mode at a fixed time after said rotation varies said angle to said value.

6. A portable computer, comprising:
   a base unit containing a keyboard;

a display unit pivotally attached to said base unit, said display unit forming an angle with said base unit;

a switch concealed within said display unit; said switch comprising:

a lever movably mounted within said display unit to determine whether said portable computer goes into a low power consumption mode by moving between a first operational state and a second and different operational state in dependence upon change of said angle between said display unit and said base unit as said display unit is rotated about said base unit.

7. A portable computer, comprising:

a base unit containing a keyboard;

a display unit pivotally attached to said base unit, said display unit forming an angle with said base unit;

a switch mounted within said display unit, said switch comprising:

a pivot;

a lever that rotates about said pivot; and an electrical contact that determines whether said portable computer goes into a low power consumption mode by changing electrical contact with said lever in dependence upon said angle of said display unit relative to said base unit.

8. The portable computer of claim 7, wherein said lever rotates about said pivot in response to gravity as said display unit rotates about said base unit to change said angle to a value within a range of between less than ninety degrees and about thirty degrees as said display unit is rotated about said base unit.

9. The portable computer of claim 7, further comprising a magnet positioned within said display unit to attract said lever to said electrical contact.

10. The portable computer of claim 7, further comprising a delay operationally coupled to said switch and operationally interposed between said changing electrical contact of said lever with said electrical contact and activation of said low power consumption mode of said portable computer.

11. A portable computer, comprising:

a base unit having a keyboard;

a cover unit encasing a video display, rotatably attached to said base unit;

a switch comprised of a lever pivotally mounted within said cover unit that activates a low power consumption mode in said portable computer by making a change in a state of operatinal contact within said switch in response to gravity as said cover unit is rotated about said base unit.

12. A portable computer, comprising:

a base unit having a keyboard;

a cover unit encasing a video display, rotatably attached to said base unit;

a switch that varies power consumption by said portable computer as said cover unit is rotated about said base unit, said switch comprising:

a pivot located within said cover unit;

a lever that rotates about said pivot; and an electrical contact that operationally controls consumption of power by said computer in dependence upon rotation of said cover unit relative to said base unit by changing operational contact with said lever as an angle of said cover unit relative to said base unit decreases.

13. The portable computer of claim 12, wherein said pivot, said lever, and said electrical contact are concealed within said cover unit.

14. The portable computer of claim 12, further comprising a delay operationally interposed between said making of operational contact to said lever with said electrical contact and activation of a low power consumption mode by said portable computer.

15. The portable computer of claim 11, further comprising a delay operationally interposed between said change in said state of operational contact and activation of said low power consumption mode.

16. The portable computer of claim 11, further comprised of a delay operationally interposed between said change in said state of operational contact and said activation of said low power consumption mode modifying said power consumption by initiating said low power consumption mode after an angle between said base unit and said cover unit has been decreased to a value of between less than ninety degrees and about thirty degrees, and then initiating a power-save mode after expiration of a period of time subsequent to said angle having been decreased.

17. The portable computer of claim 12, further comprising a delay operationally interposed between said changing of said operational contact and any change in said consumption of power.

18. The portable computer of claim 12, further comprised of a delay operationally interposed between said changing of said operational contact and any change in said consumption of power, modifying said power consumption by initiating a low power consumption mode after said angle has been decreased from a value of between less than ninety degrees and about thirty degrees, and then initiating a power-save mode after expiration of a period of time subsequent to said angle having been decreased.

* * * * *